United States Patent [19]

Gammage et al.

[11] Patent Number: 4,566,098

[45] Date of Patent: Jan. 21, 1986

[54] CONTROL MECHANISM FOR A RING COMMUNICATION SYSTEM

[75] Inventors: Neil D. Gammage, Kanata; Jan K. Pachl; Liam M. Casey, both of Ottawa, all of Canada

[73] Assignee: Northern Telecom Limited, Montreal, Canada

[21] Appl. No.: 609,691

[22] Filed: May 14, 1984

[51] Int. Cl.[4] ............................................. H04J 3/16
[52] U.S. Cl. ................................. 370/89; 340/825.05
[58] Field of Search ...................... 370/86, 89, 90, 94; 340/825.05, 825.5

[56] References Cited

U.S. PATENT DOCUMENTS

| Re. 31,852 | 3/1985 | Soderblom | 370/90 |
|---|---|---|---|
| 3,597,549 | 8/1971 | Farmer et al. | 179/15 |
| 4,002,842 | 1/1977 | Meyr et al. | 179/15 |
| 4,063,220 | 12/1977 | Metcalfe et al. | 340/147 |
| 4,136,384 | 1/1979 | Okada et al. | 370/86 |
| 4,293,948 | 10/1981 | Soderblom | 370/90 |
| 4,370,744 | 1/1983 | Hirano et al. | 370/88 |
| 4,383,315 | 5/1983 | Torng | 370/89 |
| 4,387,458 | 6/1983 | Carbrey | 370/88 |
| 4,389,721 | 6/1983 | Young et al. | 370/88 |
| 4,393,497 | 7/1983 | Cantwell, Jr. | 370/89 |
| 4,413,338 | 11/1983 | Renoulin et al. | 370/89 |
| 4,494,233 | 1/1985 | Bahr et al. | 370/89 |

Primary Examiner—Douglas W. Olms
Assistant Examiner—Kenneth I. Rokoff
Attorney, Agent, or Firm—F. P. Turpin

[57] ABSTRACT

The invention provides a ring communication network having an improved error recovery mechanism. The system uses a token or toggle signal which does not have an inherent control value but one that requires the values of a contiguous pair thereof to control access to the transmission medium of the system. A station recognizes that the ring is idle if the present value of the toggle signal is the same as the value of the toggle signal in the previous frame. Conversely, a station recognizes that the ring is busy if the present value of the toggle signal is different from the value of the toggle signal in the previous frame. A station that detects an idle toggle signal and wishes to transmit data on the communication ring changes the value of the toggle signal to that which corresponds to a busy status and transmits its data.

12 Claims, 4 Drawing Figures

CONTROL MECHANISM FOR A RING COMMUNICATION SYSTEM

The invention relates generally to data communication systems and more particularly to a ring communication network having an improved token control mechanism.

In general, the prior art token passing rings consist of a set of stations serially connected by a transmission medium. Information is transferred sequentially, bit by bit, from one active station to the next. Each station receives the data, repeats each bit, and serves as the means for attaching one or more devices such as terminals and work-stations to the ring for the purpose of communicating with other devices on the network. A station that has access to the medium at any given instant may transfer information onto the ring, where it circulates from one station to the next. The addressed destination station absorbs a copy of the information as it passes. Finally, the station which transmitted the information effectively removes it from the ring.

The control mechanism for regulating the data flow in a ring topology has generally been based on the idea that permission to use the transmission medium is passed sequentially from node to node around the ring. The access function is distributed to all nodes attached to the ring. An implicit token may consist of a single bit by itself or a unique sequence of information bits that contains an indication of whether the token is free or busy. With the token-access control scheme, the free token circulates on the ring, giving each node in turn an opportunity to transmit data when it detects the token. A node having data to transmit can remove the token, transmit its data, then issue an idle token thereby allowing other nodes an opportunity to transmit.

The primary functions associated with token recognition and data transmission are performed by a ring interface adapter at each node. This adapter handles the basic transmission functions, including frame recognition, token generation, address generation, address recognition, error checking, buffering of frames, link fault detection, as well as interfacing with a user facility. The adapter may also comprise a token holding timer for controlling the maximum period of time a station may use the transmission medium before passing the token and an error detection and recovery mechanism to restore network operation in the event that transmission errors cause the access method to deviate from normal operation.

Ring communications are generally well known in the art as exemplified by Olof Soderblom U.S. Pat. No. 4,293,948 on Oct. 6, 1981. This patent describes a master-slave ring communication system in which control of the ring is passed sequentially from one station to the next. A station obtains use of the ring by detecting the presence of a pair of control signals on the ring and preventing further downstream progress of those control signals. The station that obtains control transmits its data followed by the control signals necessary to inform the next station downstream that it has completed its transmission thereby providing it with the opportunity to transmit data in its turn. Reception of the control signals by the master station is an indication that all the slave stations have had the opportunity to transmit information. In view of its dominant position, the master station is called upon to solve transmission problems occurring on the medium by controlling the recovery process of the ring.

Another form of token passing ring communication system is described in W. D. Farmer et al U.S. Pat. No. 3,597,549 on Aug. 3, 1971. The patent describes a closed loop transmission line linking all stations in a multistation ring network on which a continuous bipolar bit signal is maintained for providing station clock recovery. A station transmits data by overwriting the loop signal with the station outgoing message, and an end-of-message code on the loop is followed by a token. A station wishing to transmit effectively removes the token from the ring to signify to down-line stations that it has seized control and then immediately transmits its message followed by the token. Control of the loop is thus similarly passed around the loop to provide every station in turn an opportunity to transmit data. One of the stations is operated as a supervisory station to exert overriding control of the common loop when loop operation or administrative troubles develop.

As long as all of the system components function flawlessly, the token ring operates correctly. However, if the token is ever accidentally lost or mutilated as for example, by a noise burst on the transmission medium, failure of the system results. Therefore, any ring control strategy must be prepared to restart itself after a transient error by regenerating the permission to send and bestowing it uniquely upon one of the nodes. Unfortunately, with a completely decentralized control strategy, it is very difficult to determine with certainty that the control entity has been lost, and it is even more difficult to decide which node should control the ring. Thus, there must be provided either some sort of contention scheme to deal with error recovery or have a single node provide a centralized mechanism for restart.

In accordance with the invention there is provided a ring network having an improved error recovery mechanism. The network comprises a plurality of stations connected in a ring topology. Frames of voice and data messages are transmitted unidirectionally from station to station around the ring and the total delay through all stations exceeds the time needed to transmit one frame. A frame is associated with clock and framing signals, so that every station on the ring can identify individual bits in the frame. One of the stations functions as a control station; it is responsible for generating the clock and framing signals and for ensuring that there is exactly one frame of data on the ring at any instant. The speech portions of frames carry independent speech channels whereas all control and signalling information is transmitted in the data portion of frames in addition to the information data being communicated between stations. The control mechanism for the ring uses a token which does not have an inherent control value as in the prior art but which requires the values of a contiguous pair thereof to control access to the transmission medium of the system.

The control mechanism for the ring communication network comprises a toggle signal that precedes the data portion of every frame. The interface adapter at every station is provided with means for recognizing the value of the toggle signal and means for changing its characteristic when the station wishes to insert data on the ring. A station recognizes that the ring is idle if the present value of the toggle signal is the same as the value of the toggle signal in the previous frame. Conversely, a station recognizes that the ring is busy if the present value of the toggle signal is different from the value of the toggle signal in the previous frame. A station that detects that the ring is idle and that wishes to transmit data on the communication ring changes the value of the toggle signal and transmits its data. When a station has finished transmitting, it monitors the next frame to verify that the data has been correctly transmitted all the way around the ring; however, the station does not modify the toggle signal.

In a first embodiment of the invention a toggle signal comprises a single bit (T) that precedes the data portion of the frame. When the values of the toggle bit in the present and the previous frame have not been corrupted by transmission errors, the two values determine whether the frame is busy or idle. The frame is busy if the two values differ and idle if they are the same. Whenever the frame is idle, any station that wishes to transmit can mark it busy by toggling the T-bit and use it for sending data.

When the T-bit value is corrupted by a noise burst or other reason, either an idle frame is marked busy or a busy frame is marked idle. The former condition corrects itself after one frame time because all the stations on the ring will assume that the frame is busy and hence, after a roundtrip of the ring, the frame will be recognized as being idle again.

However, error recovery is somewhat more involved when a busy frame is accidentally marked idle. In that case, several stations may transmit in the same frame. To discover the conflict, every station that transmitted must compare the content of the frame of data coming back around the ring with the frame of data it transmitted. If the two differ but the incoming frame is valid, then a conflict has occurred and the station abstains from transmitting in the next N frames. In this case, N corresponds to at least the number of stations on the ring.

In a second embodiment of the invention, an even more robust recovery mechanism is provided. The toggle signal comprises a pair of bits; a T-bit as in the first embodiment and a reset or R-bit preceding the T-bit. The significance of the T-bit is the same as described above, but only if the value of R is a predetermined one of two values (normal value). When the value of R is the other value (reset value), the station is forced to a reset state; it stores the value of the T-bit, but does not transmit any new frames of data and ignores any frames of data addressed to it. The R-bit is set to the reset value by the first station to detect a conflict and it will be set to the normal value by the first station to recognize the reset value in two consecutive frames. Thus, all the stations on the ring will have been reset and the conflict resolved in one frame time.

The two methods described above provide a more robust recovery mechanism for ring mechanism than was heretofore known, by resolution of the conflicts caused by transmission errors. A still further variation of the invention provides a control mechanism for the prevention of conflicts, at least with a large degree of probability.

In a third embodiment of the invention, the toggle signal is a byte (T-byte) of data preceding the data portion of the frame. The frame is considered idle if the T-byte value in the present frame is the same as that in the previous frame, and is considered busy if the T-byte values are different. A station wishing to transmit data modifies the T-byte to mark the ring busy.

An example embodiment of the invention will now be described in conjunction with the drawings in which.

Figure 1:
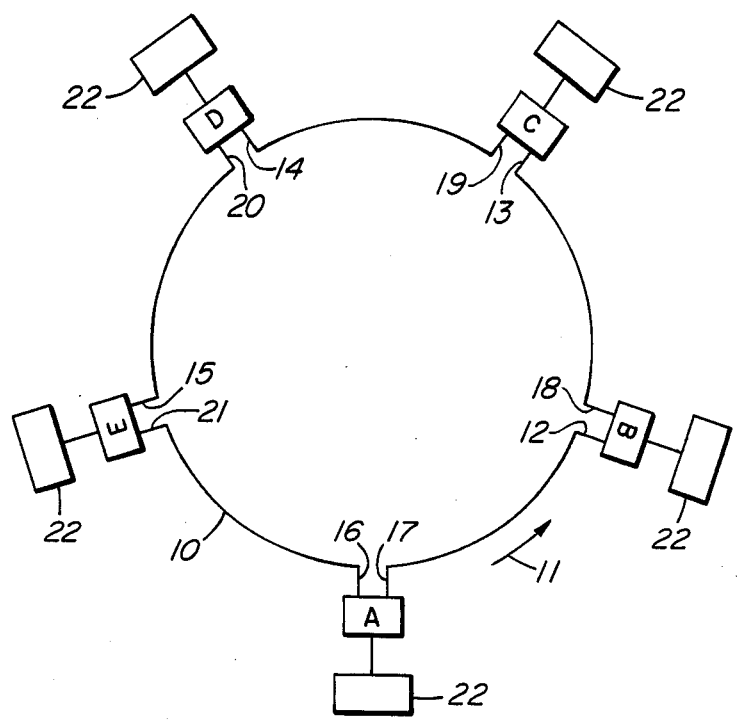
FIG. 1 is a generalized ring communication system such as may utilize a control mechanism in accordance with the invention.

FIG. 1 illustrates a ring communication system comprising a set of stations A, B, C, D, E, serially connected by a transmission medium 10. Information is transferred sequentially, bit by bit, from one station to the next, in the direction indicated by arrow 11. Data flows into receive ports 12-16 of stations A, B, C, D, E and is transmitted out of transmit ports 17-21 to the medium 10. Each station regenerates and repeats each bit or it transmits its own data, and serves as the means for attaching one or more devices 22 to the ring for the purpose of communicating with other devices on the network. The devices 22 may be terminals, workstations, or other types of user equipment which usually comprise a microprocessor and are software controlled. Generally, a given station obtains access to the medium and transfers information onto the ring where the information circulates from one station to the next. The addressed destination station(s) copies the information as it passes and acknowledges reception by modifying a status field of the data. Finally, the station which transmitted the information receives the modified status field from the destination station. Since ring communication systems are serial in nature, the failure of any one station can cause the entire system to fail. Therefore, a bridging function at every station may be provided so that, at the occurrence of a failure, the receive and transmit ports of the failed station are bridged and the circuit is again complete.

Figure 2:
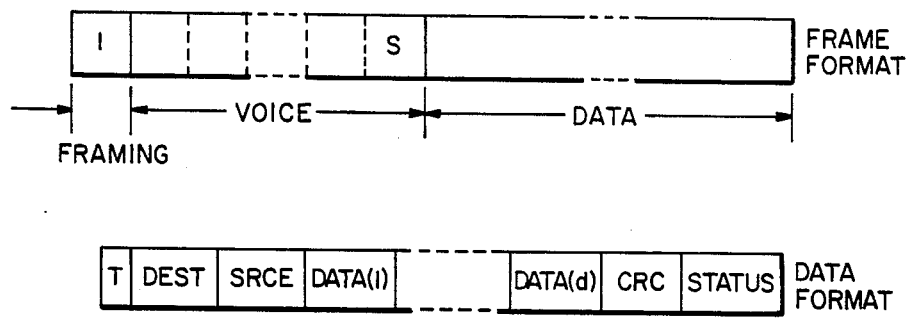
FIG. 2 is a pair of bit stream charts illustrating the format of signals employed for information and control in the system of FIG. 1.

Access control to the transmission medium is through the use of a token signal which precedes the data field and which may be a single bit or a unique signalling sequence. FIG. 2 is a pair of diagrams illustrating the data format for the ring communication system of FIG. 1 which will be assumed to provide synchronous communication between stations on the ring. Hence, the ring may be used for speech transmission if the proper timing is employed. In FIG. 2, the diagrams depict the formats of the fields in the sequence that they are transmitted on the medium, with the left-most bit transmitted first. The first diagram of FIG. 2 shows the frame format for the ring system of FIG. 1 as having a voice portion and a data portion as well as a framing field. The ring carries frames of data of a fixed length such that a frame circulates around the ring every 125 microseconds. For example, at a transmission rate of 2.56 megabits per second, the frame length is 320 bits. This is consistent with an eight kilohertz sampling rate for voice. The number of speech channels, the length of the speech bytes, the data packet length, and the length of the data bytes may be configured in a number of alternative ways within the constraint of the fixed frame length. For example, a typical choice for a 320 bit frame length may be a speech portion of 8×10 bit bytes and a data portion of 30×8 bit bytes. Similarly, one may use a format having 8 speech bytes of eight bits plus 32 data bytes of eight bits.

The speech bytes are used to carry S independent speech channels and all control and signalling associated with these channels is transmitted as data packets in the data portion of a frame. The ring interface at each station can be programmed to receive and insert speech samples from any speech channel so that a conversation may be allocated to any channel.

The frame format is synchronized with the use of framing data which is generated by the control station on the ring; this data precedes every frame of information and is used by every station to generate clocking signals. Of course, the framing signals must be easily differentiated from any data that may normally be transmitted. For instance, the use of bipolar violations in a byte of data generated using differential Manchester encoding may be used effectively for this purpose. This type of coding is generally well known in the art and is described, for example, in Digital Computer Technology and Design, Vol. II, by Willis H. Ware, John Wiley and Sons, 1963.

Since the system uses a fixed length frame format and synchronous transmission, it is necessary to ensure that the time delay around the ring be constant. Hence, one of the stations must be provided with a means for generating a transmission delay that together with the sum of the unit delays of each station equals the desired frame time (125 μsec). The station provided with the delay means may conveniently be the same station that generates the framing signals and is designated the control station. Except for this timing function, the control station is identical to the other stations on the ring.

The data format of a frame is illustrated in the second diagram of FIG. 2 which shows the first information data to be a token signal which, as described earlier, may be a single bit (T), or a pair of bits T and R or a byte of data. The following byte of data forms the DEST field which specifies the destination address of the packet followed by the SRCE byte which identifies the address of the station that sent the packet. The ensuing d-bytes are the data to be transferred between stations and this is followed by a cyclic redundancy check (CRC) byte which is derived from the data portion of the frame in tne generally well-known manner. The last byte of the frame is the STATUS byte which is used to indicate the reception status of the packet. Typically, the STATUS byte is used to indicate (1) Packet not Received, (2) Receiver Busy, (3) CRC Error, or (4) Packet Received OK. Of course, if no data is being sent, then all fields other than the token signal and the framing signal are undefined.

Figure 3A:
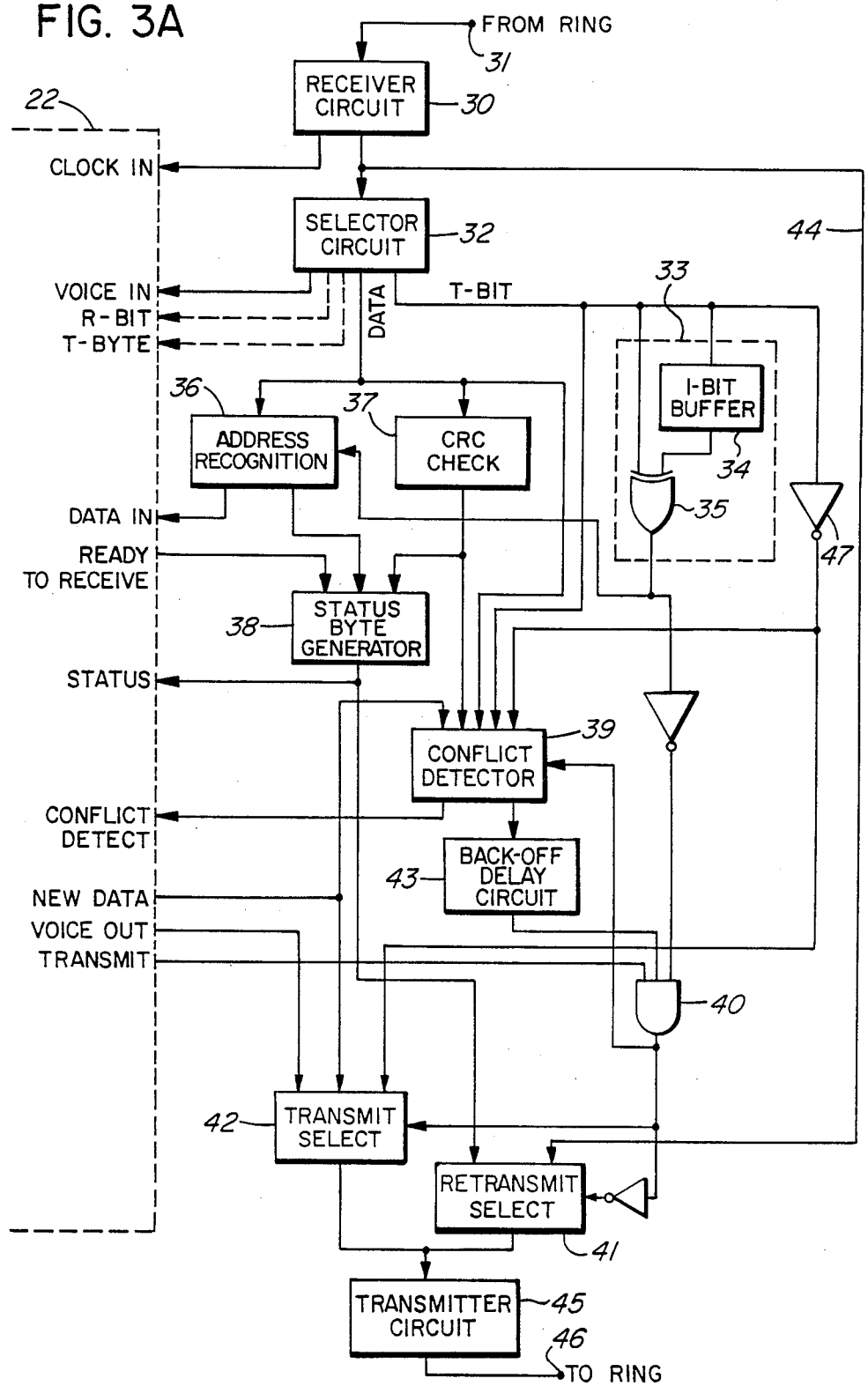
FIG. 3A is a block circuit diagram of a slave station of the system of FIG. 1.

FIG. 3A is a block circuit diagram of a slave station interface circuit used to connect a user device such as 22 to the transmission medium of a ring communication system as illustrated in FIG. 1. The serial data stream on the transmission medium is connected to a receiver circuit 30 via a receive port 31. The receiver circuit 30 serves to decouple the station from the transmission medium and derives a clock signal from the input signal for controlling the timing of the slave station. The receiver circuit 30 consequently comprises a register, phase decoder, and phase-lock loop circuitry. The input signal is fed to a selector circuit 32 which apportions the signal into its voice, T-bit, and data components. The voice signal is sent to the user terminal for decoding into its analog form. The T-bit is fed to a past-present state detector 33 for providing a first signal when the value of the T-bit in the present frame is the same as the value of the T-bit in the previous frame and a second signal when the previous and present values are different. The detector may comprise a one bit buffer 34 and an exclusive-OR gate 35.

The data portion of the input signal is fed to an address recognition circuit 36 which, upon positive response, causes the input data to be transferred to the user device 22. A CRC check circuit 37 responds to the input data by providing inputs to a STATUS-byte generator circuit 38 and to a collision detector circuit 39. An AND gate 40 provides transmit select signals to output select circuits 41 and 42 in response to signals from the detector 33, a Back-off delay circuit 43, and a transmit signal from the user device 22. The delay circuit 43 provides the required amount of delay or "wait period" following a collision detection by the detector 39. The retransmit select circuit 41 causes the adapter circuit input signal to be fed through on lead 44 to a transmitter circuit 45 and thence to the transmit port 46 and the ring transmission medium in the absence of an enable signal from gate 40. The transmit select circuit 42, on the other hand, responds to an enable signal from gate 40 for allowing the user station to transmit its own voice signal, a toggled T-bit via inverter 47, and its own data fields.

Figure 3B:
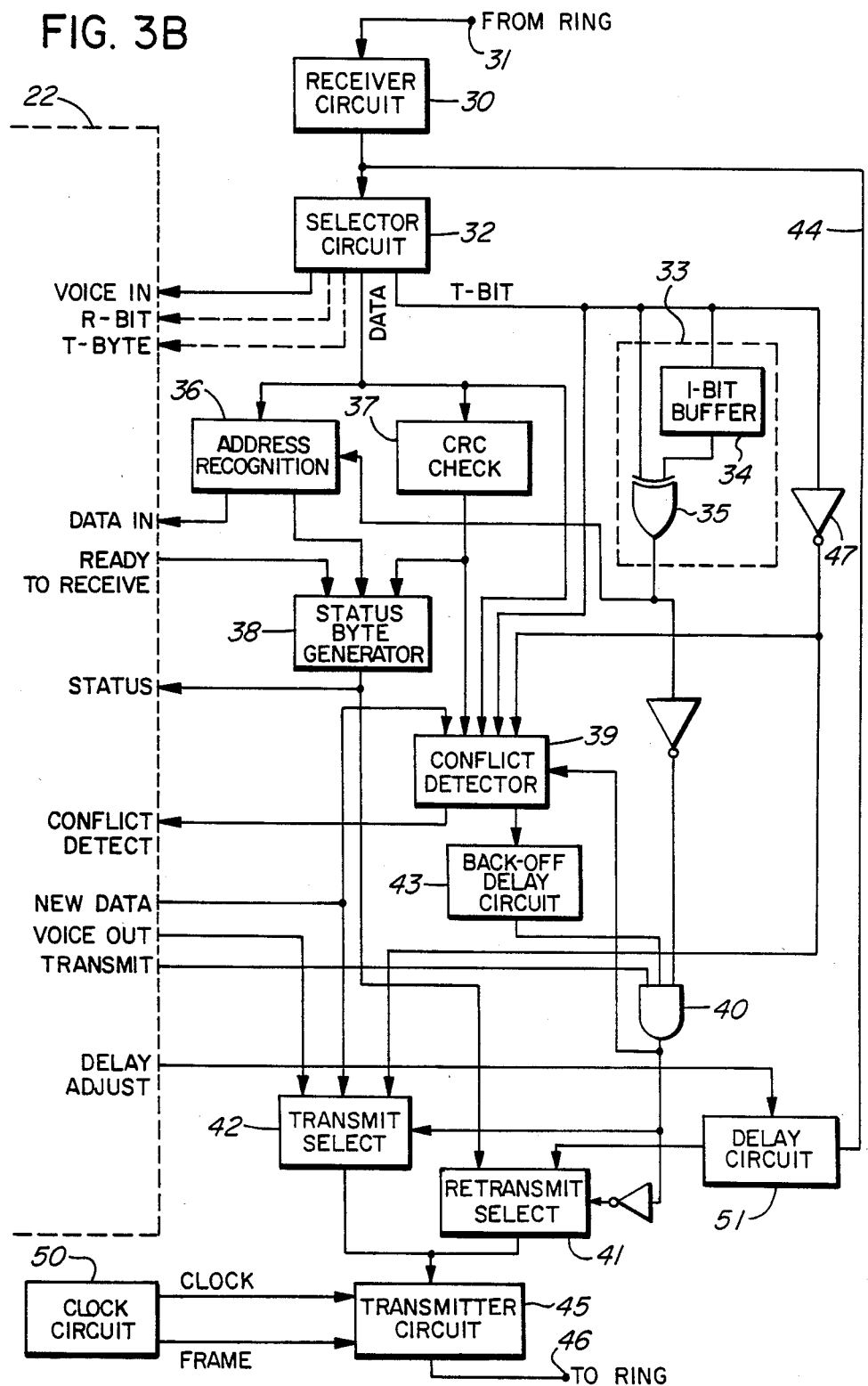
FIG. 3B is a block circuit diagram of a control station of the system of FIG. 1.

FIG. 3B is a block circuit diagram of a control station interface circuit for connecting a user device 22 to the transmission medium of a ring communication system as illustrated in FIG. 1. As the circuit of FIG. 3B is very similar to that of FIG. 3A, similar circuits are identically labelled. Since the receiver circuit 30 is not required to extract timing signals from the receive port input signal, the receiver does not require circuitry such as phase-lock loop circuits. Instead, this interface circuitry requires a clock circuit 50 for generating framing signals and providing clock signals to the transmit circuit 45. In addition, the interface circuitry requires a delay circuit 51 which may conveniently be a tapped serial register inserted serially into lead 44. This delay circuit is controllable by the user device to ensure that synchronism of transmission on the ring is maintained. Apart from these differences, the station operates in exactly the same way as a slave station for transmitting and receiving packets.

The user device 22 may be a terminal or workstation and may comprise a suitably programmed general purpose computer or microprocessor adapted to control and digitize voice signals as well as manipulate data under control of a source of clock signals.

In operation, the control station of the ring communication system supplies framing information from which every slave station derives clock signals; it also inserts a delay in the ring to ensure that a frame of data circulates around the ring every 125 microseconds. At every slave station, the incoming serial bit stream is received and clock is extracted by the receiver circuit 30 for use by the interface logic and as the transmit clock source. The outgoing bit stream may be selected to be a retransmission of the input signal or new data originating at the station. In the following description of operation, the interface is assumed to be in retransmit mode unless it is stated to be transmitting data.

In order to transmit speech, a station must be assigned one of the S speech channels. The station waits for the frame signal, then counts a predetermined number of bit periods to the start of the speech byte in the channel it has been assigned. It then extracts the speech sample contained in the assigned channel and simultaneously inserts its own speech sample, in the same channel.

Every station continually monitors the frames passing by on the ring, and stores the last value of the T-bit in buffer 34. Every frame time a new value of the T-bit is received and is compared with the previous value. The data portion of the frame immediately following the T-bit is idle or not being used if the new T-bit value is the same as the previous one. The data portion is being used or busy if the two T-bit values differ.

To transmit a data packet, the station waits for the frame signal from which the start of the data portion of the frame is readily determined. It receives the T-bit and determines whether the data portion is busy or idle. If it is busy, the station waits for the next frame and repeats the process. If the data portion is idle, the station toggles the value of the T-bit—from 0 to 1 or from 1 to 0—to mark the data portion busy and it then sends the destination and source addresses in the DEST and SRCE fields followed by the data in the DATA bytes, checksum in the CRC byte, and sets the STATUS byte value to 'Packet Not Received'

The station waits for the next frame pulse and then monitors the data portion but does not modify it; if more data needs to be transmitted, the station waits for the next idle frame. If the data corresponds to that just sent, the STATUS byte is sent to the user station processor. If the data differs from that sent, the processor is informed by the detector 39 that a transmission error has occurred and if, in addition, the CRC field is consistent with the data, then the station enters a recovery process as described below.

When a station is willing to receive data, it waits for the frame pulse and for the start of the data portion. If the T-bit indicates busy and the DEST byte contains this station's address, it receives and retransmits the SRCE, DATA, and CRC fields and performs its own CRC check. If the check is OK, it transmits 'Packet Received OK' as the STATUS byte, otherwise it transmits 'CRC Error' as the STATUS byte.

A station that cannot receive packets temporarily, as for example when its hardware or software buffers are full, will still monitor the ring, looking for valid packets addressed to it. It will retransmit any such packet unchanged and insert 'Receiver Busy' as the STATUS byte. This indication will be received by the sender who will forward it to its processor for analysis and disposition.

As discussed above, the value of the T-bit may be corrupted by a noise burst or other reason. When an idle frame is accidentally marked busy, the situation corrects itself after one frame time because all stations assume that the frame is busy and merely retransmit it, so that after one round trip of the ring, the frame is recognized as being idle again. This is because the token signal has no inherent significance; its significance is determined by a pair of contiguous token signals.

When a busy frame is accidentally marked idle, several stations along the ring may attempt to transmit in the same frame. The station whose frame of data is on the ring detects this abnormal condition when its conflict detector circuit 39 provides an output to the user processor and to the back-off delay circuit 43 which, in turn, disables gate 40 and prevents an enable to select circuit 42 from being generated. Thus, the station is inhibited from transmitting on the ring for the duration of the back-off period which corresponds to at least N frames where N is the number of stations on the ring. For example, with twenty-five stations on the ring, the back-off delay period would be $25 \times 125$ $\mu\text{sec} = 3.125$ milliseconds. At the end of the back-off delay, the ring resumes normal operation.

A variation of the above-described control mechanism for a ring communication system may be obtained by having the toggle signal comprise a pair of bits, a T-bit as just described and a reset or R-bit preceding the T-bit. The significance of the T-bit to a station is the same as above-described but only if the value of the R-bit is a predetermined one of two values, for example 0. If the value of the R-bit is the other value, for example 1, a station responds by entering a reset state. The value of the T-bit is stored by the stations on the ring but a station does not transmit new frames of data and ignores any frames of data addressed to it until the value of the R-bit has re-assumed the predetermined (no-problem) value. FIGS. 3A and 3B show the receive selector circuit 32 as having a dotted line output lead labelled R-bit. The processor unit of the station causes the interface circuit to respond in accordance with the value of the R-bit received on that lead.

As in the one bit method, a station that transmitted data monitors the next frame of data and compares it with the data it transmitted, to detect a transmission conflict caused by an accidental change of the T-bit value. If a conflict exists, the station sets the R-bit in the next frame to a ONE, thereby causing all the stations on the ring to reset. Any station sets the R-bit to ZERO if its value is a ONE in two consecutive frames; therefore, the entire ring will again be operational after two frame periods as compared with N+1 frame periods for the first method.

Of course, an accidental change of the R-bit from a 1 (problem condition) to a 0 bit (no-problem condition) may lead to another transmission conflict. In that case, the first station to discover the conflict will set the R-bit to the problem condition (1) and the ring will reset. An accidental change of the R-bit from idle (0) to reset (1) will cause the ring to reset, but the error will again correct itself within one frame period.

The two methods described above provide a more robust recovery mechanism for ring systems than was heretofore known, by resolution of the conflicts caused by transmission errors on the ring. A still further variation of the invention provides a control mechanism for the prevention of conflicts, at least with a large degree of probability. In this embodiment, the frame of data is preceded by a T-byte. The frame is considered idle if the T-byte value in the present frame is the same as that in the previous frame, and is considered busy if the T-byte values are different.

For example, if the present and the previous values of the T-byte seen by a station wishing to transmit are the same, say A, then the station changes the T-byte to another value, say B, and uses the frame for sending data. The value B should be chosen, so that an accidental change caused by transmission problems from B to A is extremely unlikely so that it can be assumed to be practically impossible. This result may be enhanced by ensuring that there is a large Hamming distance between the values of the A and B bytes. For example, paired codes for the A and B bytes may be 00111100-11000011 or 10101010-01010101. In these examples, the B bytes are derived by inverting the A bytes; transmission errors in these codes may cause an idle frame to appear busy but the recovery is completed automatically as described above. Alternatively, the A and B bytes could have fixed values. In such a case, an error correction procedure may be applied to recover from transmission errors and it may also be provided that if the idle byte accidentally changes to any value other than the busy byte, the change will not be acknowledged and no conflict will be declared.

This embodiment of the invention may be realized using the circuits of FIGS. 3A and 3B. Of course, the past-present detector 33 for the toggle signal would have to be modified to accommodate the T-byte. It may even be desirable to feed the T-byte signal to the processor of the user station for analysis and control thereof.

A feature of the system described above is that the ring bandwidth is fairly divided between stations that wish to transmit. If there are N stations attempting to transmit continuously, each one will have to wait the maximum of N frame times before it detects an idle data part and transmits data. Thus each station receives $1/(N+1)$ of the total available ring bandwidth.

The protocol forces any station with a long message to send to split it into a number of fixed length packets for transmission, and forces a station receiving a message to concatenate the packets it receives in order to reconstruct the original message. This disassembly and reassembly would of course be the responsibility of higher level software residing in the user station processor.

In the case where a station is not able to reassemble more than one message at a time it must be possible to accept only packets from a selected source and reject all others. Alternatively, the protocol may allow a transmitting station to send as many packets as are necessary to transmit a complete message once it detects an idle frame. This simplifies reassembly since the packets constituting a message will arrive in consecutive frames, and another station may not 'break in' on the packet sequence. It also increases throughput for, if there is a single station attempting to transmit, then it receives ½ of the available bandwidth compared to the full bandwidth in the alternative protocol. This alternative, however, destroys the equity distribution properties of the ring since a station which continuously sends small packets receives a smaller portion of the bandwidth than a station that continuously sends long messages.

The control mechanism for ring communication systems provided by the invention offers a simpler recovery procedure and hence a more robust system than heretofore known. This is achieved by providing the system with a token signal which does not have an inherent control value as in the prior art but which requires the values of a contiguous pair thereof to control access to the transmission medium of the system.

What is claimed is:

1. A communication system comprising, a plurality of stations each having an input port for receiving data and an output port for transmitting data, and a transmission medium for interconnecting said stations in a ring, each of the stations comprising means for determining the busy/idle status of the ring, one of said stations comprising means for generating clock and framing signals, each frame of data on the ring being preceded by a toggle signal having one or another value, the determining means being responsive to the values of the toggle signal in two consecutive frames for determining the busy/idle status of the ring whereby a station recognizes the ring as being idle only if the present value of the toggle signal is the same as the value of the toggle signal in the previous frame, and a station recognizes the ring as being busy only if the present value of the toggle signal is different from the value of the toggle signal in the previous frame.

2. A communication system as defined in claim 1 wherein each station comprises interface circuitry for receiving and transmitting data from and to the ring, the circuitry comprising said means for determining the busy/idle status of the ring and wherein the determining means is a past-present value circuit providing a first signal if the ring is idle and a second signal if the ring is busy.

3. A communication system as defined in claim 2 wherein the interface circuitry comprises means responsive to the second signal for retransmitting the frame of data received by the station and means responsive to the first signal for transmitting data originating from the station to the ring and for toggling the value of the toggle signal from its present value to its other value.

4. A communication system as defined in claim 3 wherein the data is transmitted synchronously on the ring, each frame of data having a voice portion and a data portion with the toggle signal preceding the data portion, the interface circuitry of said one of said stations further comprising an adjustable delay means in series with the retransmission path of the frame of data thereby to ensure the synchronism of the data on the ring communication system.

5. A communication system as defined in claim 1 wherein the toggle signal comprises a single bit of data.

6. A communication system as defined in claim 1 wherein the toggle signal comprises a byte of data having a first value and a second value.

7. A communication system as defined in claim 6 wherein the first value of the toggle signal is a large hamming distance from the second value of the toggle signal.

8. A communication system as defined in claim 1 wherein each frame of data further comprises a status bit preceding the toggle signal, each station being nonresponsive to a first value of the status bit and being responsive to a second value thereof for re-initializing itself.

9. A method of controlling access to the transmission medium of a ring communication system by any one of a plurality of stations on the ring, one of the stations comprising means for generating clock and framing signals, comprising the steps of, providing each frame of data on the ring with a toggle signal preceding the remainder of the frame, the toggle signal being adapted to assume one or another value, and determining the busy/idle status of the ring in response to the past and present values of a pair of consecutive toggle signals, a station recognizing the ring to be idle only if the present value of the toggle signal is the same as the value of the toggle signal in the previous frame, and a station recognizing the ring to be busy only if the present value of the toggle signal is different from the value of the toggle signal in the previous frame.

10. A method as defined in claim 9, and further comprising the step of generating first and second signals in response to the determination of the idle or busy status respectively, of the ring.

11. A method as defined in claim 10 and further comprising the steps of retransmitting the frame of data a station receives in response to the second signal and enabling the station to transmit its own data in response to the first signal.

12. A method as defined in claim 11 and further comprising the step of toggling the value of the toggle signal from its present value to its other value in response to the first signal.

* * * * *